United States Patent [19]

Smith

[11] Patent Number: 5,034,507
[45] Date of Patent: Jul. 23, 1991

[54] PROCESS FOR PREPARING POLYKETONES WITH BORON CONTAINING ANION SOURCE AND A QUINONE

[75] Inventor: Kevin G. Smith, Staines, England

[73] Assignee: The British Petroleum Company plc, London, England

[21] Appl. No.: 508,184

[22] Filed: Apr. 12, 1990

[30] Foreign Application Priority Data

Apr. 26, 1989 [GB] United Kingdom ................ 8909476

[51] Int. Cl.$^5$ ............................................. C08G 67/02
[52] U.S. Cl. ..................................... 528/392; 528/271
[58] Field of Search ............................... 528/392, 271

[56] References Cited

FOREIGN PATENT DOCUMENTS 0229408 7/1987 European Pat. Off. .
0314309 5/1989 European Pat. Off. .

Primary Examiner—Harold D. Anderson
Attorney, Agent, or Firm—Nixon & Vanderhye

[57] ABSTRACT

A process for preparing linear, alternating interpolymers of olefins and carbon monoxide (polyketones) comprises reacting carbon monoxide with one or more olefins in the presence of a catalyst prepared by reacting a source of palladium, with a bidentante amine, phosphine, arsine or stibine and a anion of a anion having the formula:

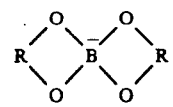

wherein the R groups are independently selected from $C_1$ to $C_6$ alkylene groups, ortho-phenylene or biphenylene groups or groups having the formula:

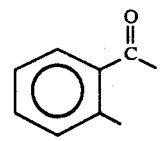

or substituted derivatives thereof. The process is characterized by being carried out in the presence of a quinone e.g. benzoquinone.

6 Claims, No Drawings

PROCESS FOR PREPARING POLYKETONES WITH BORON CONTAINING ANION SOURCE AND A QUINONE

The present invention relates to a process for preparing interpolymers of olefins and carbon monoxide by polymerizing a mixture of one or more olefins and carbon monoxide in the presence of a palladium catalyst. In particular, the present invention relates to new palladium catalysts for use in such processes.

The preparation of linear alternating interpolymers of olefins and carbon monoxide having the formula:

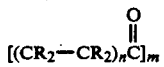

where the R groups are independently hydrogen or hydrocarbyl groups, n is at least 1 and m is a large integer, is known from U.S. Pat. No. 3,694,412. Such linear alternating interpolymers, which hereafter will be called polyketones, are prepared according to U.S. Pat. No. 3,694,412 by polymerizing a mixture of one or more olefins and carbon monoxide in the presence of an aryl phosphine complex of a palladium halide and an inert solvent. However, the processes described in U.S. Pat. No. 3,694,412 are slow even at elevated temperature and pressure.

An improved version of the process described in U.S. Pat. No. 3,694,412 is described in European patent applications 181014 and 121965. It was subsequently found that the rate of the polymerization process could be increased considerably by using a palladium catalyst with inter alia a bidentate phosphine and the anion of a carboxylic acid having a pKa of lower than 2 (as measured in aqueous solution). Examples of anions which can be used include trichloroacetate, dichloroacetate, tetrafluoroborate, hexafluorophosphate and p-toluene sulphonate, such anions being respectively the conjugate anions of trichloroacetic acid (pKa 0.70), dichloroacetic acid (pKa=1.48), tetrafluoroboric acid, hexafluorophosphoric acid and p-toluenesulphonic acid.

More recently EP 222454 suggests that any acid having a pKa of less than 5 (determined in aqueous solution at 18° C.) can be used.

Our European application number 314309A teaches that the process described in European patents 181014, 121965 and 222454 can be improved by using a boron-containing anion of formula:

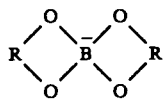

instead of the anion derived from trichloroacetic acid, dichloroacetic acid, tetrafluoroboric acid, hexafluorophosphoric acid and p-toluene sulphonic acid.

The problem to be solved in this instance is to improve further, if possible, the rate of polyketone production.

It has now been found that the process described in EP 181014, 121965 and 222454 can be improved by the use of a boron-containing anion in combination with effective amounts of an oxidant.

According to the present invention there is provided a process for preparing polyketones by polymerizing a mixture of carbon monoxide and one or more olefins in the presence of a palladium catalyst prepared by reacting together:

(a) a source of palladium, (b) a bidentate amine, phosphine, arsine or stibine having the formula $(R^1)_2M—R^2—M(R^1)_2$ wherein the M atoms are independently selected from nitrogen, phosphorus, arsenic or antimony, the $R^1$ are independently alkyl, cycloalkyl or aryl groups and $R^2$ is an alkylene group, and (c) a source of an anion having the formula:

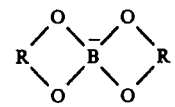

wherein the R groups are independently selected from the group consisting of $C_1$ to $C_6$ alkylene groups, orthophenylene or biphenylene groups or substituted derivatives thereof or groups having the formula:

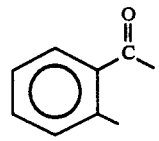

or substituted derivatives thereof, characterised in that the process is carried out in the presence of a quinone.

The present invention solves the problem of improving the productivity of the processes described in the prior art by using a combination of a boron-containing anion of the formula described above with a quinone as oxidant.

The term polyketone is used herein to mean an interpolymer of one or one or more olefins with carbon monoxide. The idealised structure of such a material would comprise a one, two or three dimensional network of strictly alternating olefin and carbon monoxide units. Although polyketones prepared according to the present invention correspond to this idealised structure, it is envisaged that materials corresponding to this structure in the main but containing small regimes (i.e. up to 10 wt %) of the corresponding polyolefin also fall within the definition.

Anions which are preferably employed in the process of the present invention include species such as:

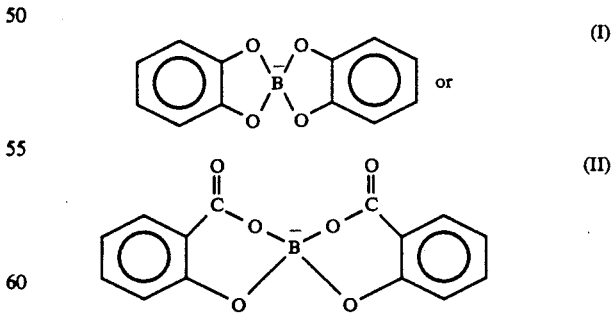

and analogues in which the benzene rings are partially or completely substituted with, e.g. halogen, alkyl or sulphonic acid moieties. Anions corresponding to (I) are hydrolysable and hence the corresponding acid has no measurable pka in aqueous solution. It is a feature of the present invention that palladium catalysts using anion (I) or (II) are more active than those using the anion of p-toluenesulphonic acid, a preferred anion according to EP 121965.

A particularly preferred class of anions are those having the general formula:

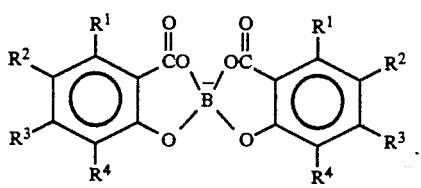

wherein $R^1$, $R^2$, $R^3$ and $R^4$ are independently selected from the group consisting of hydrogen, $C_1$ to $C_6$ alkyl, chlorine, bromine and iodine. Of this class, most preferred are those anions in which three of the groups $R^1$, $R^2$, $R^3$ and $R^4$ are hydrogen on each benzene ring and the other is selected from $C_1$ to $C_4$ alkyl, chlorine or bromine. Examples include the cases where (i) $R^1=R^3=R^4=H$ and $R^2$ is Cl, Br or $CH_3$ and (ii) $R^1=R^2=R^4$ and $R^3$ is $CH_3$.

The palladium catalyst used in the process described above is itself prepared by reacting together a source of palladium, an appropriate amine, phosphine, arsine or stibine and anion having the formula defined above. As regards the source of palladium this can include simple inorganic and organic salts, e.g. halides, nitrates, carboxylates and the like as well as organometallic and coordination complexes. In some cases, by suitable choice of coordination complex, it may be possible to add the palladium and the amine, phosphine, arsine or stibine as a single entity.

Although any source of palladium can be used, it may be necessary, when a palladium complex having strongly coordinating ligands is employed, to ensure that such ligands are removed. An example of such a complex is palladium acetate where the acetate anions bind strongly to the palladium. In such cases the acetate anions can be removed by adding component (c) above as its conjugate acid since such a conjugate acid will protonate the acetate anions and cause their removal.

Another approach which is useful when palladium halides are employed (halide anions also bind strongly to the palladium) is to use a thallium or silver salt of component (c). In such cases a metathesis reaction occurs and the insoluble silver or thallium halide precipitates and can be removed by filtration.

The other component of the catalyst is a bidentate amine, phosphine, arsine or stibine having the formula $(R^1)_2M$—$R^2$—$M(R^1)_2$ where the M atoms are independently selected from nitrogen, phosphorus, arsenic or antimony. The $R^1$ groups are independently selected from alkyl, cycloalkyl or aryl groups with $C_1$ to $C_4$ alkyl and phenyl groups being preferred. The $R^2$ group is an alkylene group. In the context of this document alkylene groups are defined as being —$(CH_2)_a(CHR^3)_b$— groups in which the $R^3$ groups are independently hydrogen, methyl, ethyl or propyl groups and a and b are either zero or integers such that a+b is at least 2, preferably between 2 and 10. Preferably the alkylene group is selected from —$(CH_2)_2$—, —$(CH_2)_3$—, —$(CH_2)_4$— and —$(CH_2)_5$—. Of these the most convenient species are the bidentate phosphines, 1,2-bis(diphenylphosphino)ethane (diphos), 1,3-bis(diphenylphosphino)propane and 1,4-bis(diphenylphosphino)butane.

The bidentate amines, phosphines, arsines or stibines defined above all either bond exclusively cis to the palladium or there is a reasonable concentration of this cis binding. Whilst not wishing to be held to any theory, it is believed that it is a cis type isomer which is catalytically active.

Considering next the feedstocks for the polymerization feedstock, it is believed that any source of carbon monoxide can be used. Thus the carbon monoxide may contain nitrogen, inert gases and up to 10% hydrogen.

Whilst the quinone used can in principle be any quinone, preferred examples include benzoquinone, $C_1$ to $C_4$ alkyl substituted benzoquinones, halo substituted benzoquinones and napthaquinone. The most preferred quinone is 1,4-benzoquinone. The amount of quinone used is such that the molar ratio of quinone to palladium is in the range 1:1 to 5,000:1.

Any olefin can in theory be used although the best reaction rates are obtained when either ethylene or a mixture of olefins which include ethylene, e.g. ethylene/propylene, ethylene/butylene, ethylene/hexene and the like, is used. The lower rates obtained in the absence of ethylene should not be construed as indicating that the process can be used only with an ethylene feedstock since other olefins such as propylene, 4,methylpentene-1, styrene, acrylates, vinyl acetates and the like all undergo reaction to some extent.

The polymerisation process is suitably carried out in a solvent which is chemically inert under the conditions employed and one in which the palladium catalyst is soluble. Moreover, the solvent like the anion should be either weakly or non-coordinating. Examples of such solvents include alcohols, e.g. methanol, ethanol and propanol, ethers, glycols and glycol ethers. Preferred solvents are methanol or ethoxyethanol.

The polymerization process is suitably carried out at a temperature in the range 20° to 150° C. preferably 50° to 120° C. and at elevated pressure, (e.g. 1 to 100 bars). The overpressure of gas is suitably carbon monoxide or carbon monoxide and olefin, if the olefin is gaseous under the reaction conditions. It is possible to operate the polymerization process either batchwise or continuously.

The following Examples illustrate the present invention.

EXAMPLE 1

A carbon monoxide/propylene/ethylene terpolymer was prepared as follows: a magnetically stirred autoclave of 300 cm³ capacity was charged with HBSA (borosalicylic acid) (1.60 g) and p-benzoquinone (0.25 g) in MeOH (70 cm³). Propylene (28.11 g) was condensed into the autoclave and a mixture of 1:1 ethylene/carbon monoxide introduced (10 bar). The mixture was heated to 50° C., whereupon a catalyst solution prepared by refluxing palladium acetate (25 mg) and bis(diphenylphosphino)propane (66 mg) in MeOH (10 cm³) was introduced into the autoclave via an injector system at a working pressure of 50 bar.

After 3 hours the reaction was terminated by cooling to room temperature and then releasing the pressure. The polymer was filtered off, washed with MeOH, then acetone and air dried at room temperature. The yield was 7.59 g of polymer.

EXAMPLES 2-5

Example 1 was repeated using differing amounts of benzoquinone. The results obtained are as follows:

| Example | p-benzoquinone (g) | Propylene (g) | Time (hrs) | Polymer yield (g) |
| --- | --- | --- | --- | --- |
| 2 | 0.5 | 27.38 | 2.91 | 10.31 |
| 3 | 1.0 | 27.7 | 3.10 | 13.13 |
| 4 | 2.0 | 27.43 | 3.44 | 19.26 |
| 5 | 4.0 | 28.46 | 2.78 | 20.92 |

EXAMPLE 6

Example 1 was repeated except that the autoclave was charged with HBSA (1.8 g) and p-benzoquinone (2.0 g) in MeOH (100 cm$^3$). The vessel was purged with a mixture of 1:1 ethylene/carbon monoxide (1×50 bar) and heated under an atmosphere of ethylene/carbon monoxide (10 bar) to 70° C. A catalyst mixture, prepared as before, was injected into the autoclave at a working pressure of 50 bar.

After 2.87 hours the reaction was terminated by cooling to room temperature and releasing the pressure. The polymer was filtered off, washed with MeOH, then acetone and air dried at room temperature. The yield was 42.3 g.

COMPARATIVE TEST A

Example 1 was repeated except that the p-benzoquinone was omitted. After 2.96 hours of reaction at 50° C., 3.9 g of polymer were obtained.

EXAMPLE 7

Example 1 was repeated except that the autoclave was charged with HBSA (0.9 g), p-benzoquinone (2 g) and hexene (40 cm$^3$). The vessel was purged with 1:1 ethylene/carbon monoxide (1×50 bar) and heated under an atmosphere of ethylene/carbon monoxide (20 bar) to 70° C. The catalyst, prepared as before, was injected. After 1.37 hours the reaction was stopped by cooling to room temperature and releasing the pressure. The polymer was isolated by filtration and washed with MeOH, then acetone and air dried at room temperature. The yield was 27.6 g.

COMPARATIVE TEST B

Example 4 was repeated but with 50 cm$^3$ of hexene and no p-benzoquinone, 3.53 g of polymer in 3.6 hours were obtained. HBSA=

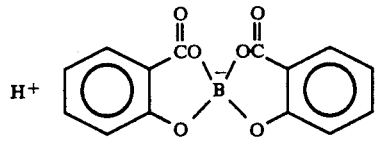

I claim:

1. A process for preparing polyketones by polymerising a mixture of carbon monoxide and one or more olefins in the presence of a palladium catalyst prepared by reacting together:
   (a) a source of palladium,
   (b) a bidentate amine, phosphine, arsine or stibine having the formula $(R^1)_2M-R^2-M(R^1)_2$ wherein the M atoms are independently selected from nitrogen, phosphorus, arsenic or antimony, the $R^1$ are independently alkyl, cycloalkyl or aryl groups and $R^2$ is an alkylene group, and
   (c) a source of an anion having the formula:

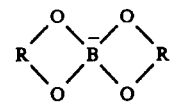

wherein B is boron and the R groups are independently selected from the group consisting of $C_1$ to $C_6$ alkylene groups, ortho-phenylene or biphenylene groups or substituted derivatives thereof or groups having the formula:

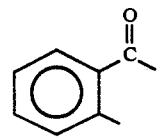

or substituted derivatives thereof, the process being carried out in the presence of a quinone.

2. A process as claimed in claim 1 wherein the quinone is selected from benzoquinone, $C_1$ to $C_4$ alkyl substituted benzoquinones, halo-substituted benzoquinones or naphthaquinone.

3. A process as claimed in claim 1 wherein the molar ratio of quinone to palladium is in the range 1:1 to 5,000:1.

4. A process as claimed in claim 1 wherein an olefin mixture comprising ethylene is employed.

5. A process as claimed in claim 1 comprising polymerizing in methanol or ethoxyethanol solvent.

6. A process as claimed in claim 1 comprising polymerizing at a temperature in the range 50° to 120° C.